UNITED STATES PATENT OFFICE 2,368,682

ANTHRAQUINONE DYESTUFF

George W. Seymour and Burnard Theodore Pull, Cumberland, Md., assignors to Celanese Corporation of America, a corporation of Delaware No Drawing. Application November 28, 1940, Serial No. 367,630

8 Claims. (Cl. 8—40)

This invention relates to the manufacture of dyestuffs of the anthraquinone series and relates more particularly to the manufacture of dyestuffs which are valuable for the coloration of textile materials comprising organic derivatives of cellulose.

An object of our invention is the preparation of anthraquinone dyestuffs for the coloration of organic derivative of cellulose materials.

Another object of our invention is the preparation of anthraquinone dyestuffs which may be used for the coloration of organic derivative of cellulose materials to produce fast colors which are highly resistant to acid fading.

Other objects of our invention will appear from the following detailed description.

Many dyestuffs of the anthraquinone series which have been prepared are useful for the coloration of organic derivative of cellulose materials such as organic esters and organic ethers of cellulose. These anthraquinone dyestuffs have been obtained in numerous colors and among these some of the most valuable are those derivatives which color organic derivative of cellulose materials in the various shades of blue. A difficulty encountered in using anthraquinone dyestuffs which color organic derivative of cellulose materials in various shades of blue is that while the colors are resistant to changes caused by the usual agencies which textile materials must withstand, they are not sufficiently resistant to fading when the colored materials are exposed to the action of an acid atmosphere such as that produced by the products of combustion of coal, gas, etc., and changes in shade frequently result. In some cases the change produced is a dulling of the brightness of the color and in others the material takes on a noticeably redder hue. Such changes naturally restrict the range of usefulness of these dyestuffs and produce considerable consumer sales resistance to the purchase of other articles of such shade.

We have now discovered that anthraquinone dyestuffs which dye organic derivative of cellulose materials in desirable green-blue shades and which are highly resistant to acid fading may be obtained by the condensation of hydroxylamino-anthraquinones with lower aliphatic aldehydes in an inert solvent in the presence of certain catalytic agents.

Various lower aliphatic aldehydes may be used for condensation with hydroxylamino-anthraquinones to form the acid-fast dyestuffs of our invention. Among the suitable aldehydes may be mentioned formaldehyde, acetaldehyde, butyraldehyde, crotonaldehyde, and benzaldehyde. The hydroxylamino-anthraquinones may be prepared by the reduction of nitro-anthraquinones with stannous chloride and caustic soda. Condensation with the hydroxylamino derivatives obtainable by the above alkaline reduction of 4,8-dinitro-anthrarufine, 2,4,6,8-tetra-nitro-anthraquinone, 2,4,6,8-tetra-nitro 1,5 dihydroxy anthraquinone (see Beilstein, 4th edition, volume 8, page 457) and other hydroxylamino-anthraquinones yield particularly valuable dyestuffs. The condensation reaction may be carried out by refluxing the particular hydroxylamino-anthraquinone and the aldehyde with which it is to be condensed in the presence of a suitable inert organic solvent. Solvents such as ethyl alcohol, methyl alcohol, dioxane, butyl alcohol, and ethylene formal may be used. Preferably the reaction is carried out using ethyl alcohol as the solvent. The temperature at which the refluxing takes place will of course vary depending upon the particular solvent which is being used. When ethyl alcohol is used, the reflux temperature will be about 78° C. The condensation reaction may be carried out at temperatures from about 50° C. up to 150° C. using a suitable inert solvent.

While the condensation reaction may be carried out without the aid of catalytic agents, it is preferable that the reaction be carried out in the presence of a catalyst. Suitable catalytic agents are such metal salts as copper sulfate, tin sulfate, cupric chloride, stannous chloride, and the like, but preferably we use cupric chloride. The catalyst may be used in an amount varying from about 1 to 10% based on the weight of the anthraquinone derivative being condensed.

The time necessary for completion of the condensation reaction will also vary depending upon the particular reactants being employed. Generally, refluxing from 2 to 10 hours is sufficient to obtain dyestuffs exhibiting suitable resistance to acid fading. Further refluxing beyond the optimum time necessary for preparing a particular dyestuff may be carried out, if desired, to vary the shade of the dyestuff.

The dyestuffs may be used in various ways. They may be applied by a vat process in the leuco or reduced form and then oxidized to the desired color or they may be applied in solution when sufficiently soluble, in aqueous suspension or in colloidal form. When used on organic derivative of cellulose materials, these dyestuffs may be applied in any manner as by dyeing, printing, stencilling or other method of local application.

The coloring matters of our invention are particularly applicable for the coloration of organic derivatives of cellulose such as cellulose esters and cellulose ethers. Examples of such esters are cellulose acetate, cellulose propionate, cellulose butyrate, and mixed esters such as cellulose aceto-propionate and cellulose aceto-butyrate. Examples of cellulose ethers are ethyl cellulose and benzyl cellulose. The dyestuffs may also be applied to mixed materials containing one or more of the organic derivatives of cellulose above and other textile fibers such as cotton, silk, wool or artificial fibers such as regenerated cellulose. These materials may be colored by the same dyestuffs as the organic derivative of cellulose materials when said dyestuffs have an affinity for the materials or they may be colored the same or different shades by means of other dyestuffs, before, after or simultaneously with the coloration of the cellulose esters or ethers.

In order further to illustrate our invention but without being limited thereto the following examples are given:

Example I 30 parts by weight of 4,8-di-hydroxylamino-anthrarufine prepared by reducing 4,8-dinitro-anthrarufine with stannous chloride and caustic soda are reacted with 20 parts of 40% formaldehyde in 250 parts of ethyl alcohol. The mixture is refluxed for 8 hours, cooled to 70° C. and the resulting dyestuff is separated by filtration.

25 parts of the dyestuff isolated in this manner are milled in a ball mill with an equal weight of Turkey red oil until the dyestuff is entirely dispersed. The color may then be standardized as desired by the addition of dextrin, sodium sulfate or other diluent, the material then being dried and milled to powder form. The powdered dyestuff is then dispersed in a solution of sodium sulfo-naphthalene ricinoleate, the mixture heated with steam and diluted with water and then added to the dye-bath which is held to pH 5–7.5. A cellulose acetate fabric is entered in the dye-bath and full color value with good exhaustion of the dye-bath is obtained in one hour at 75 to 85° C.

The material dyed in a green-blue shade in the above manner with this dyestuff shows excellent fastness properties when subjected to the action of an atmosphere containing combustion gases for 20 hours and good fastness at 40 hours. 40 hours is sufficient commercial resistance for any dyestuff.

Example II 30 parts by weight of 4,8-di-hydroxylamino-anthrarufine, prepared as in Example I, are reacted with 20 parts of 40% formaldehyde in 160 parts of ethyl alcohol to which has been added 2 parts of cupric chloride. The reactants are refluxed for 7 hours, cooled to room temperature, and the resulting dyestuff isolated by filtration.

A dye-bath is prepared with this dyestuff in the manner indicated in Example I and a cellulose acetate material is dyed therein. The resulting fabric dyed in a green-blue shade shows a very high degree of fastness to acid fading.

Example III 30 parts by weight of 4,8-di-hydroxylamino-anthrarufine, prepared as in Example I, are reacted with 20 parts of butyraldehyde in 200 parts of ethyl alcohol to which has been added 2 parts of stannous chloride. The reactants are refluxed for 8 hours, cooled, and the resulting dyestuff filtered off.

This dyestuff dyes cellulose acetate fabrics in blue shades resistant to acid fading.

It is to be understood that the foregoing detailed description is given merely by way of illustration and that many variations may be made therein without departing from the spirit of our invention.

Having described our invention, what we desire to secure by Letters Patent is:

1. Process for the production of anthraquinone dyestuffs fast to acid fading, which comprises condensing an aliphatic aldehyde with a 4,8-di-hydroxylamino-anthrarufine.

2. Process for the production of an anthraquinone dyestuff fast to acid fading, which comprises condensing formaldehyde with 4,8-di-hydroxylamino-anthrarufine.

3. Anthraquinone dyestuffs fast to acid fading produced by condensing an aliphatic aldehyde with 4,8-di-hydroxylamino-anthrarufine.

4. An anthraquinone dyestuff which dyes in green-blue shades fast to acid fading produced by condensing formaldehyde with 4,8-di-hydroxylamino-anthrarufine.

5. The process of coloring material made of or containing an organic derivative of cellulose which comprises applying thereto an anthraquinone dyestuff fast to acid fading produced by condensing an aliphatic aldehyde with 4,8-di-hydroxylamino-anthrarufine.

6. The process of coloring material made of or containing cellulose acetate, which comprises applying thereto an anthraquinone dyestuff which is produced by condensing an aliphatic aldehyde with 4,8-di-hydroxylamino-anthrarufine.

7. Material made of or containing an organic derivative of cellulose colored with an anthraquinone dyestuff fast to acid fading produced by condensing an aliphatic aldehyde with 4,8-di-hydroxylamino-anthrarufine.

8. Material made of or containing cellulose acetate colored with an anthraquinone dyestuff which is produced by condensing an aliphatic aldehyde with 4,8-di-hydroxylamino-anthrarufine.

GEORGE W. SEYMOUR.
BURNARD THEODORE PULL.